US012565230B2

(12) United States Patent
Abbaspour et al.

(10) Patent No.: US 12,565,230 B2
(45) Date of Patent: Mar. 3, 2026

(54) VEHICLE ENVIRONMENT SENSOR RELIABILITY DETERMINATION

(71) Applicant: QUALCOMM Incorporated, San Diego, CA (US)

(72) Inventors: Ali Reza Abbaspour, Escondido, CA (US); Volodimir Slobodyanyuk, San Diego, CA (US); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 18/453,725

(22) Filed: Aug. 22, 2023

(65) Prior Publication Data

US 2025/0065905 A1 Feb. 27, 2025

(51) Int. Cl.
 *B60W 60/00* (2020.01)
 *B60W 50/00* (2006.01)
 *B60W 50/02* (2012.01)
(52) U.S. Cl.
 CPC ...... *B60W 60/001* (2020.02); *B60W 50/0205* (2013.01); *B60W 2050/0083* (2013.01); *B60W 2050/021* (2013.01)
(58) Field of Classification Search
 CPC ........... B60W 60/001; B60W 50/0205; B60W 2050/0083; B60W 2050/021; B60W 60/0018; B60W 60/0053; B60W 2050/0215; G01S 2013/9316; G01S 7/40; G01S 13/931; G01S 17/931; G01S 7/497; G01S 13/86
 See application file for complete search history.

(56) References Cited

U.S. PATENT DOCUMENTS

| | | | | |
|---|---|---|---|---|
| 11,685,402 B2 * | 6/2023 | Lee | ................... | B60W 60/0027 |
| | | | | 701/27 |
| 12,151,703 B2 * | 11/2024 | Köstermann | ......... | B60W 50/10 |
| 2017/0234966 A1 * | 8/2017 | Naguib | ................... | G01S 13/86 |
| | | | | 367/117 |
| 2019/0064799 A1 * | 2/2019 | Amirloo Abolfathi | ...................... | |
| | | | | G05D 1/0055 |

(Continued)

FOREIGN PATENT DOCUMENTS

| | | | | |
|---|---|---|---|---|
| KR | 102644324 B1 * | 3/2024 | ............ | B60W 30/10 |

OTHER PUBLICATIONS

KR-102644324-B1 translation (Year: 2024).*
Information_oriented_trustworthiness_evalutation_Gurung_2013 (Year: 2013).*

*Primary Examiner* — Kyle T Johnson
(74) *Attorney, Agent, or Firm* — Holland & Hart LLP/ QUALCOMM Incorporated

(57) ABSTRACT

An environment perception method, at an ego vehicle, includes: receiving, from a device external to the ego vehicle, one or more first reliability factors associated with the device and with a first value of a parameter of an environment; determining, based on the one or more first reliability factors, a first reliability of the first value; determining, based on one or more second reliability factors associated with the ego vehicle and with a second value of the parameter of the environment provided by one or more sensors of the ego vehicle, a second reliability of the second value; and providing a reliability indication indicating which of the first value and the second value is more reliable based on which of the first reliability and the second reliability is a higher reliability.

30 Claims, 8 Drawing Sheets

(56) References Cited

U.S. PATENT DOCUMENTS

| | | | | |
|---|---|---|---|---|
| 2019/0204427 | A1* | 7/2019 | Abari | G01S 17/86 |
| 2019/0353784 | A1* | 11/2019 | Toledano | G05D 1/2435 |
| 2019/0369234 | A1* | 12/2019 | Wetoschkin | B60W 50/14 |
| 2020/0094848 | A1* | 3/2020 | Hu | G07C 5/008 |
| 2020/0180650 | A1* | 6/2020 | Lee | B60W 50/14 |
| 2020/0282929 | A1* | 9/2020 | Kroeger | G01S 7/497 |
| 2021/0125010 | A1* | 4/2021 | Kim | G01S 13/865 |
| 2022/0105956 | A1* | 4/2022 | Köstermann | H04W 4/46 |
| 2022/0126864 | A1* | 4/2022 | Moustafa | B60W 50/14 |
| 2022/0341749 | A1* | 10/2022 | Voigt | G01S 17/931 |
| 2023/0242145 | A1* | 8/2023 | Tsuchiya | B60W 60/001 |
| | | | | 701/23 |
| 2024/0098245 | A1* | 3/2024 | Adams | H04N 17/002 |
| 2024/0317216 | A1* | 9/2024 | Jo | B60W 30/09 |
| 2024/0375666 | A1* | 11/2024 | Baba | G05D 1/02 |
| 2025/0065905 | A1* | 2/2025 | Abbaspour | G01S 7/40 |

* cited by examiner

| Inputs | Long-range camera | Port short-range radar | . . . | Lane-following camera | 610 |
| | Long-range radar | Side camera | . . . | N/A | 620 |
| Outputs | Keep distance at high speed | Lane change | . . . | Lane keeping | 630 |

700

800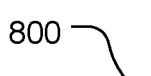

| Receiving, at an ego vehicle from a device external to the ego vehicle, one or more first reliability factors associated with the device and with a first value of a parameter of an environment containing the ego vehicle | 810 |

| Determining, at the ego vehicle based on the one or more first reliability factors, a first reliability of the first value of the parameter | 820 |

| Determining, at the ego vehicle based on one or more second reliability factors associated with the ego vehicle and with a second value of the parameter of the environment provided by one or more sensors of the ego vehicle, a second reliability of the second value of the parameter of the environment | 830 |

| Providing, by the ego vehicle, a reliability indication indicating which of the first value of the parameter of the environment and the second value of the parameter of the environment is more reliable based on which of the first reliability and the second reliability is a higher reliability | 840 |

FIG. 8

VEHICLE ENVIRONMENT SENSOR RELIABILITY DETERMINATION

BACKGROUND

Autonomous vehicles (also known as self-driving vehicles) are becoming more popular. The potential for reduced vehicle collisions, improved traffic flow efficiency, increased vehicle efficiency (e.g., miles per gallon of gasoline, miles per kilowatt of electricity, etc.), increased user efficiency (e.g., freeing a would-be driver to perform other tasks while in transit), etc. is pushing demand for autonomous vehicles. In order to gain approval and acceptance of autonomous vehicles, vehicle designers and manufacturers are working to address numerous considerations (especially safety considerations) so that autonomous vehicles can have acceptable performance, e.g., acceptable collision avoidance.

Accurate data from sensors of autonomous vehicles helps ensure that decisions based on the data will be good and/or that actions based on the data will be acceptable. Sensors may go out of calibration for any of a variety of reasons, e.g., vibrations, harsh conditions, etc. To help ensure proper operation of vehicles, especially autonomous vehicles, sensors that become decalibrated should be recalibrated. Determining a source of reliable information to be used to calibrate a vehicle sensor may be difficult, especially for dynamic calibration without stopping the vehicle or taking the vehicle to a service center.

SUMMARY

An example environment perception system, of an ego vehicle, includes: one or more sensors; one or more receivers; one or more memories; and one or more processors communicatively coupled to the one or more sensors, the one or more receivers, and the one or more memories, the one or more processors being configured to: receive, via the one or more receivers from a device external to the ego vehicle, one or more first reliability factors associated with the device and with a first value of a parameter of an environment containing the ego vehicle; determine, based on the one or more first reliability factors, a first reliability of the first value of the parameter; determine, based on one or more second reliability factors associated with the ego vehicle and with a second value of the parameter of the environment provided by the one or more sensors, a second reliability of the second value of the parameter of the environment; and provide a reliability indication indicating which of the first value of the parameter of the environment and the second value of the parameter of the environment is more reliable based on which of the first reliability and the second reliability is a higher reliability.

An example environment perception method includes: receiving, at an ego vehicle from a device external to the ego vehicle, one or more first reliability factors associated with the device and with a first value of a parameter of an environment containing the ego vehicle; determining, at the ego vehicle based on the one or more first reliability factors, a first reliability of the first value of the parameter; determining, at the ego vehicle based on one or more second reliability factors associated with the ego vehicle and with a second value of the parameter of the environment provided by one or more sensors of the ego vehicle, a second reliability of the second value of the parameter of the environment; and providing, by the ego vehicle, a reliability indication indicating which of the first value of the parameter of the environment and the second value of the parameter of the environment is more reliable based on which of the first reliability and the second reliability is a higher reliability.

Another example environment perception system, of an ego vehicle, includes: means for receiving, from a device external to the ego vehicle, one or more first reliability factors associated with the device and with a first value of a parameter of an environment containing the ego vehicle; means for determining, based on the one or more first reliability factors, a first reliability of the first value of the parameter; means for determining, based on one or more second reliability factors associated with the ego vehicle and with a second value of the parameter of the environment provided by one or more sensors of the ego vehicle, a second reliability of the second value of the parameter of the environment; and means for providing a reliability indication indicating which of the first value of the parameter of the environment and the second value of the parameter of the environment is more reliable based on which of the first reliability and the second reliability is a higher reliability.

An example non-transitory, processor-readable storage medium includes processor-readable instructions to cause one or more processors of an ego vehicle to: receive, from a device external to the ego vehicle, one or more first reliability factors associated with the device and with a first value of a parameter of an environment containing the ego vehicle; determine, based on the one or more first reliability factors, a first reliability of the first value of the parameter; determine, based on one or more second reliability factors associated with the ego vehicle and with a second value of the parameter of the environment provided by one or more sensors of the ego vehicle, a second reliability of the second value of the parameter of the environment; and provide a reliability indication indicating which of the first value of the parameter of the environment and the second value of the parameter of the environment is more reliable based on which of the first reliability and the second reliability is a higher reliability.

BRIEF DESCRIPTION OF THE DRAWINGS

FIG. 1 is an example of a simple driving environment.

FIG. 8 is a block flow diagram of an example environment perception method.

DETAILED DESCRIPTION

Figure 2:
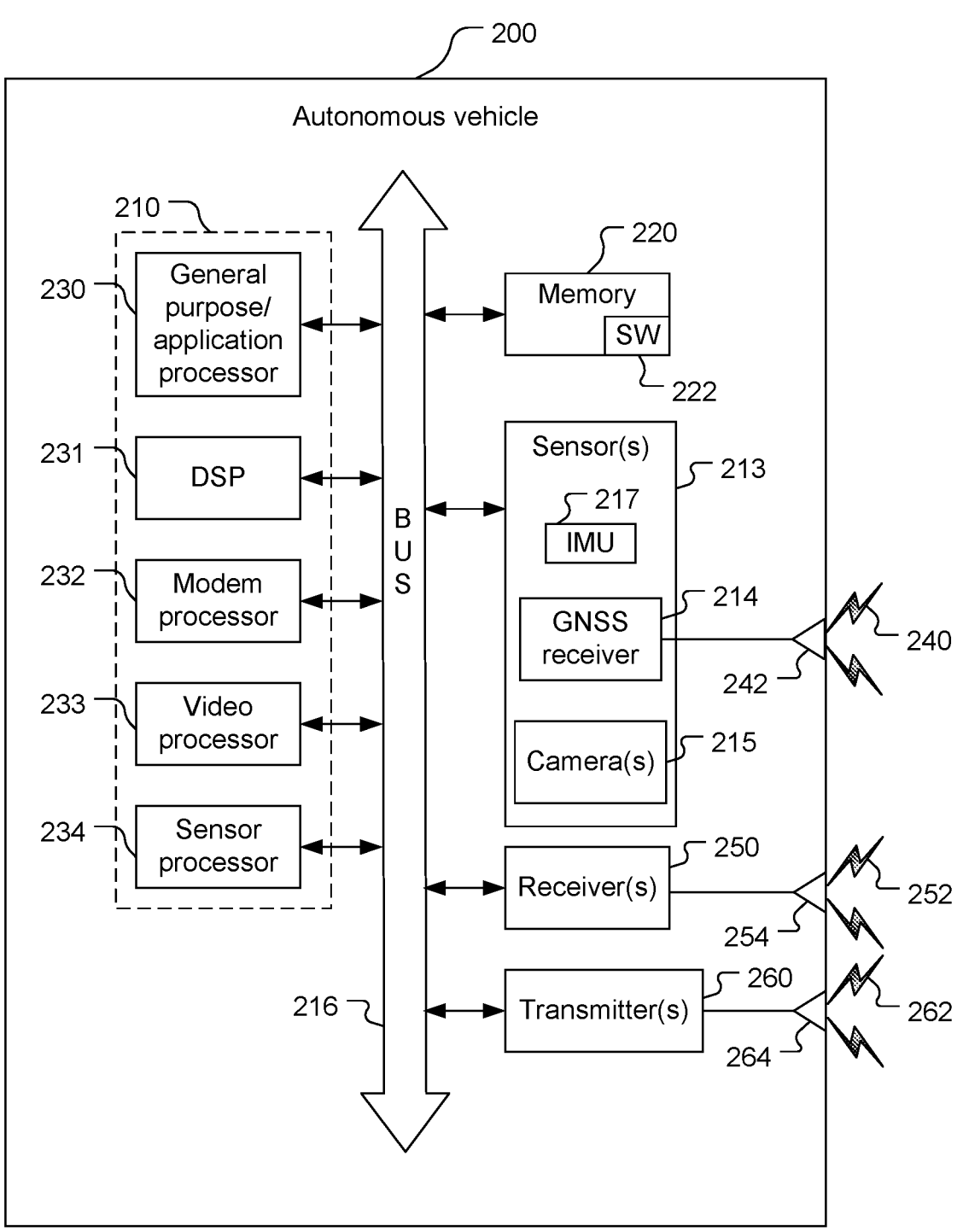
FIG. 2 is a block diagram of an example autonomous vehicle.

Techniques are discussed herein for determining one or more reliable environmental parameter values, e.g., determining one or more reliable sources of sensor information corresponding to one or more sensors of an autonomous driving ego vehicle. The reliable parameter value(s) may be used to calibrate one or more sensors of the ego vehicle. The most-reliable sensor(s) in an environment containing an ego vehicle may be used as ground truth for fault detection and/or sensor calibration. Source(s) of reliable information may be one or more roadside units and/or one or more other vehicles. The environmental parameter value(s) may be determined to be reliable by assessing one or more factors of each source of the value(s), e.g., type of device containing a sensor, sensor type, device age, sensor age, distance to the ego vehicle, source safety integrity, source security integrity, a software version corresponding to the value of the environmental parameter (e.g., of a sensor), vehicle mileage, etc. A measure of reliability, e.g., a trust value, may be determined corresponding to each environmental parameter value, e.g., to a sensor (although a single trust value may correspond to multiple sensors). If the trust value of an environmental parameter value from external to the ego vehicle is greater than a trust value of similar information produced by the ego vehicle (e.g., internal sensor information), then the external environmental parameter value may be used to calibrate a sensor of the ego vehicle. If the externally-determined (outside the ego vehicle) environmental parameter value differs from the internally-determined (by the ego vehicle) environmental parameter value by more than a threshold, then fault mitigation may be performed. One of multiple possible fault mitigation operations may be performed based on a decision hierarchy. For example, control of the ego vehicle may be turned over to a driver. If a driver is unavailable, then the ego vehicle may be navigated to a service station. If navigation to a service station is impractical, then the ego vehicle may be navigated off a current road to a safe location and stopped. If navigation off the current road is impractical, then the ego vehicle may be slowed to a stop within a present lane occupied by the ego vehicle. If slowly stopping the ego vehicle is impractical, then the ego vehicle may be stopped immediately. Other configurations, implementation, and/or operations, however, may be used.

Maintaining sensor calibration based on reliable sensor resources is desirable. Sensor calibration degradation may occur due to a variety of reasons including harsh road conditions and vibrations. Present fault detection algorithms may not be sufficient to detect systemic faults in perception sensors. An ego vehicle may measure a distance between the ego vehicle and an RSU (Roadside Unit) and compare the measurement with real-time data received from the RSU. The ego vehicle may receive relative distance and velocity information from one or more other vehicles in a vicinity that are equipped with C-V2X (Cellular Vehicle-to-Everything) capabilities. Based on information received, the most-reliable sensors may be determined using a sensor reliability algorithm (which may obtain and publish a list of most-trusted sensors to be used as a source of calibration and perception). The sensor reliability algorithm may dynamically calibrate sensors based on the most-reliable sensors available surrounding the ego vehicle. The most-reliable sensor is provided more weight in a perception system of the ego vehicle. One or more factors such as Automotive Safety Integrity Level (ASIL), security integrity level, etc., may be taken into account in the determination of the most-reliable sensor and the weight given to that sensor in the perception system of the ego vehicle. The most-reliable sensor may be used as ground truth for fault detection and sensor calibration of the ego vehicle.

Items and/or techniques described herein may provide one or more of the following capabilities, as well as other capabilities not mentioned. Safety of autonomous driving may be improved, e.g., by detecting sensor faults and/or calibrating sensors. Sensor calibration may be based on a more-trusted or most-trusted available resource, which may improve perception accuracy and autonomous vehicle safety. A dynamic list of trusted sensors may be maintained that may be used to dynamically calibrate one or more sensors. Ego vehicle sensor calibration may be performed dynamically, e.g., without taking the ego vehicle out of service (e.g., providing the ego vehicle to a service station). Ego vehicle sensor calibration may be performed based on one or more sensor measurements that are more reliable than a measurement obtained by a sensor of the ego vehicle. Ego vehicle sensor calibration may be performed only if one or more sensor measurements that are more reliable than a measurement obtained by a sensor of the ego vehicle are available. Ego vehicle sensor calibration may be avoided if one or more sensor measurements that are more reliable than a measurement obtained by a sensor of the ego vehicle are available but not significantly different than the measurement obtained by the sensor of the ego vehicle. If ego vehicle sensor calibration will not resolve an issue (e.g., autonomous driving accuracy) sufficiently, then one or more fault mitigation operations may be performed to guard against inaccurate autonomous driving. Vehicle sensor faults/failures may be detected in sensor performance and maintenance/calibration may be requested for failing or even marginally-acceptable sensors, which may, e.g., help ensure safe autonomous operation of a vehicle. A driver may be notified of irrevocable sensor failure to instruct the driver to perform a minimum risk condition (MRC) maneuver (MRM). An MRM may be performed autonomously in response to an irrevocable sensor failure. Other capabilities may be provided and not every implementation according to the disclosure must provide any, let alone all, of the capabilities discussed.

Figure 1:
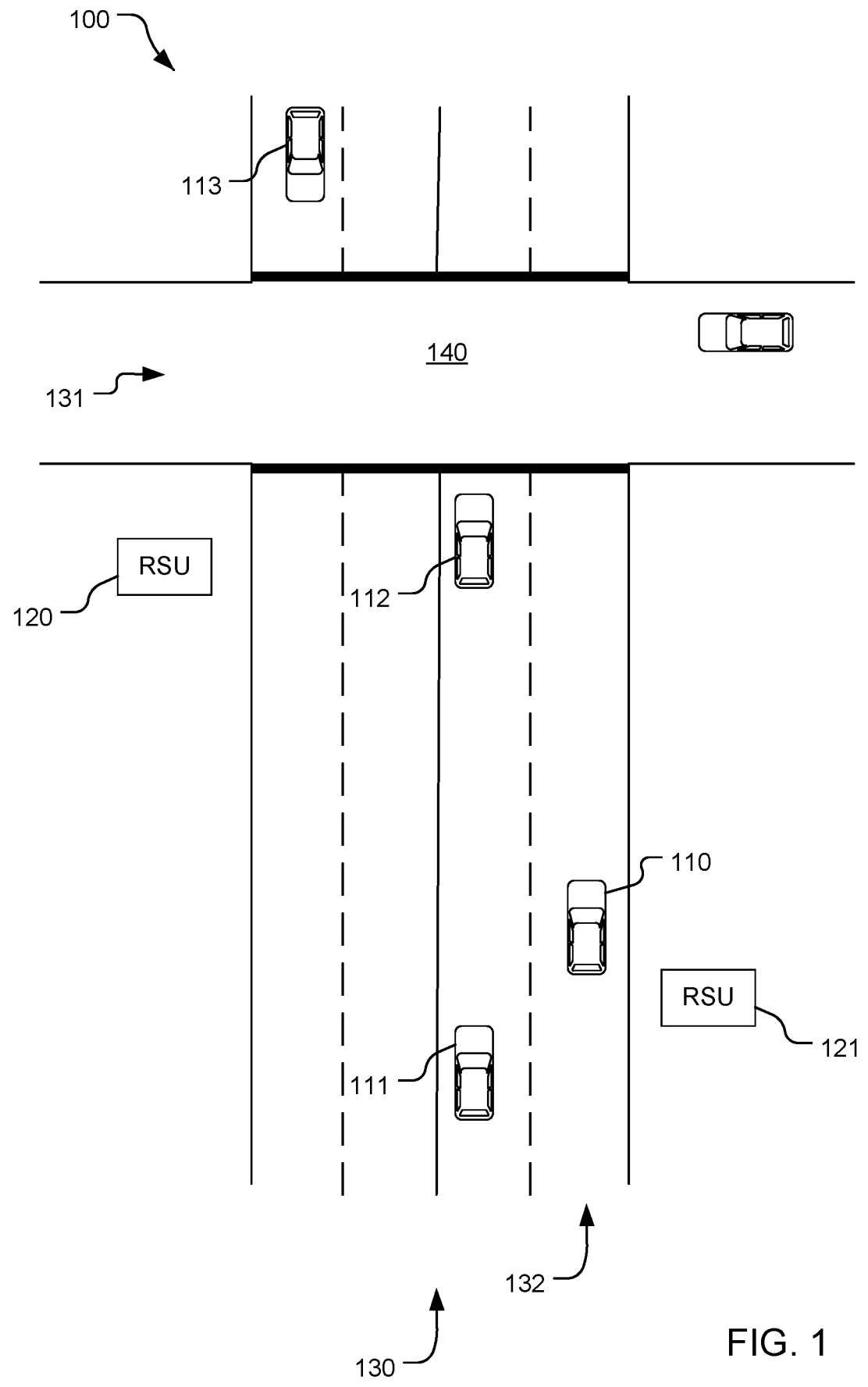

Referring to FIG. 1, a driving environment 100 includes vehicles 110, 111, 112, 113 and RSUs 120, 121 (Roadside Units). The vehicles 110-113 are disposed on a road 130 that intersects with another road 131 at an intersection 140. The vehicle 110 may be an autonomous vehicle, capable of self-driving (i.e., without human input) as well as being capable of manual driving (i.e., with human input). In order to perform autonomous driving, the vehicle 110 may have multiple sensors to help evaluate the environment 100, at least a portion of the environment 100 near the vehicle 110 and near a path of the vehicle 110 (and thus expected to be near the vehicle 110 soon). The sensors may help the vehicle 110 determine the presence of objects, likelihood of collision with an object, and/or possibilities for avoiding one or more collisions. These sensors may go out of calibration due to any of a variety of reasons, e.g., vibrations, harsh road conditions, etc. In order to facilitate autonomous driving, without having to return the vehicle 110 to a service center, the vehicle 110 may be configured to calibrate one or more sensors of the vehicle 110 based on information from one or more nearby sensors that are reliable and are sensing the environment 100. For example, the vehicle 110 may be configured to use C-V2X (Cellular Vehicle-to-Everything) communication to obtain sensor information and information from which to determine reliability of the sensor information (e.g., reliability/trustworthiness of the sensor(s) supplying the sensor information). For example, to determine sensor information reliability provided by another device, the vehicle 110 may assess an age of the device supplying the sensor information (e.g., may determine a mileage of a vehicle supplying sensor and/or may determine a model year of the vehicle supplying sensor information). Also or alternatively, the vehicle 110 may assess a safety rating (e.g., ASIL (Automotive Safety Integrity Level)) of a vehicle supplying sensor information to determine reliability of the sensor information. The vehicle 110 may be configured to use reliable sensor information (e.g., sensor information from a most reliable available source, and that is more reliable than sensor information from one or more sensors of the vehicle 110) to calibrate one or more sensors of the vehicle 110 that sense the same type of information (e.g., distance, velocity) as the received sensor information.

Referring also to FIG. 2, an autonomous vehicle 200, of which the vehicle 110 may be an example, may comprise a computing platform including a processor 210, memory 220 including software (SW) 222, one or more sensors 213, one or more receivers 250, and one or more transmitters 260. The processor 210, the memory 220, the sensor(s) 213, the receiver(s) 250, and the transmitter(s) 260 may be communicatively coupled to each other by a bus 216 (which may be configured, e.g., for optical and/or electrical communication). Even if referred to in the singular, the processor 210 may include one or more processors, the memory 220 may include one or more memories, and/or the GNSS receiver 214 may include one or more GNSS receivers. One or more of the shown apparatus (e.g., the camera(s) 215) may be omitted from the autonomous vehicle 200. The receiver(s) 250 may be communicatively coupled to one or more antennas 254 configured to transduce between wireless signals 252 and guided signals (e.g., guided by a transmission line). The transmitter(s) 260 may be communicatively coupled to one or more antennas 264 configured to transduce between wireless signals 262 and guided signals (e.g., guided by a transmission line).

The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the autonomous vehicle 200 for connectivity.

The memory 220 may be a non-transitory storage medium that may include random access memory (RAM), flash memory, disc memory, and/or read-only memory (ROM), etc. The memory 220 may store the software 222 which may be non-transitory, processor-readable, processor-executable software code containing instructions that may be configured to, when executed, cause the processor 210 to perform various functions described herein. Alternatively, the software 222 may not be directly executable by the processor 210 but may be configured to cause the processor 210, e.g., when compiled and executed, to perform the functions.

The description herein may refer to the processor 210 performing a function, but this may include other implementations such as where the processor 210 executes software and/or firmware. The description may refer to the processor 210 performing a function as shorthand for one or more of the processors 230-234 performing the function.

The description may refer to the autonomous vehicle 200 performing a function as shorthand for one or more appropriate components of the autonomous vehicle 200 performing the function. The processor 210 may include a memory with stored instructions in addition to and/or instead of the memory 220. Functionality of the processor 210 is discussed more fully below.

The configuration of the autonomous vehicle 200 shown in FIG. 2 is an example and not limiting of the disclosure, including the claims, and other configurations may be used. For example, an example configuration of the autonomous vehicle may include one or more of the processors 230-234 of the processor 210 and the memory 220. Other example configurations may omit one or more of the processors 230-234.

The autonomous vehicle 200 may include the sensor(s) 213 that may include, for example, an inertial measurement unit (IMU) 217, a Global Navigation Satellite System (GNSS) receiver 214, and/or one or more cameras 215. The sensor(s) 213 may include one or more of various types of sensors (including perception sensors) such as one or more inertial sensors, one or more magnetometers, one or more environment sensors (e.g., a thermometer, a hygrometer, etc.), one or more optical sensors, one or more weight sensors, and/or one or more radio frequency (RF) sensors, etc. The IMU 217 may comprise, for example, one or more yaw rate sensors, one or more accelerometers (e.g., collectively responding to acceleration of the autonomous vehicle 200 in three dimensions) and/or one or more gyroscopes (e.g., three-dimensional gyroscope(s)). The sensor(s) 213 may generate analog and/or digital signals, indications of which may be stored in the memory 220 and processed by the DSP 231 and/or the general-purpose/application processor 230 in support of one or more applications such as, for example, applications directed to estimating yaw rate sensor bias and removing the estimated yaw rate sensor bias from a yaw rate measurement to yield an estimated true yaw rate of the autonomous vehicle 200.

The IMU 217 may be configured to provide measurements about a direction of motion and/or a speed of motion of the autonomous vehicle 200, which may be used in various applications, e.g., blind stopping of the autonomous vehicle 200. For example, one or more accelerometers and/or one or more yaw rate sensors of the IMU 217 may detect, respectively, a translational acceleration and a speed of rotation of the autonomous vehicle 200. The translational acceleration and speed of rotation measurements of the autonomous vehicle 200 may be integrated over time to determine an instantaneous direction of motion as well as a displacement of the autonomous vehicle 200. The instantaneous direction of motion and the displacement may be integrated to track a location of the autonomous vehicle 200 and compared with a known displacement limit, e.g., lateral limits of a lane 132, and steering correction(s) may be made to help keep the autonomous vehicle 200 within the lane 132 while being autonomously stopped (e.g., without aid of camera images).

The GNSS receiver 214 (e.g., a Global Positioning System (GPS) receiver) may be capable of receiving and acquiring GNSS signals 240 via a GNSS antenna 242. The GNSS antenna 242 may be configured to transduce the GNSS signals 240 from wireless signals to wired signals, e.g., electrical or optical signals. The GNSS receiver 214 may be configured to process, in whole or in part, the acquired GNSS signals 240 for estimating a location of the autonomous vehicle 200. For example, the GNSS receiver 214 may be configured to determine location of the autonomous vehicle 200 by trilateration using the GNSS signals 240. The general-purpose/application processor 230, the memory 220, the DSP 231 and/or one or more specialized processors (not shown) may be utilized to process acquired GNSS signals, in whole or in part, and/or to calculate an estimated location of the autonomous vehicle 200, in conjunction with the GNSS receiver 214. The memory 220 may store indications (e.g., measurements) of the GNSS signals 240 and/or other signals for use in performing positioning operations, e.g., determining the location of the autonomous vehicle 200 over time and determining whether the autonomous vehicle 200 is moving in a straight line. The general-purpose/application processor 230, the DSP 231, and/or one or more specialized processors, and/or the memory 220 may provide and/or support a location engine for use in processing measurements to estimate a location of the autonomous vehicle 200.

The autonomous vehicle 200 may include the camera(s) 215 for capturing still or moving imagery. The camera(s) 215 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown) of the autonomous vehicle 200.

Figure 3:
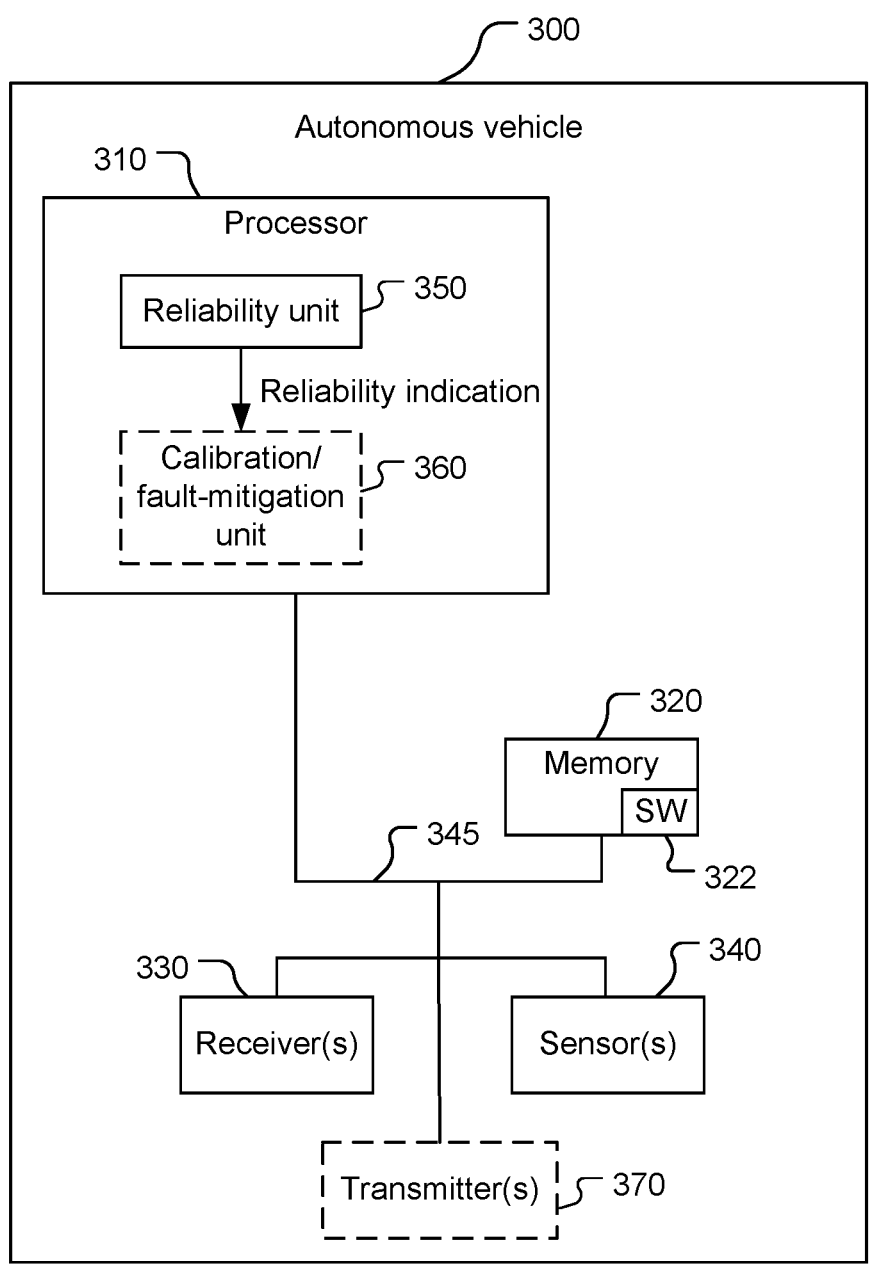
FIG. 3 is a block diagram of another example autonomous vehicle.

Referring also to FIG. 3, an autonomous vehicle 300, of which the autonomous vehicle 200 may be an example, may comprise a computing platform including a processor 310, memory 320 including software (SW) 322, one or more receivers 330, and one or more sensors 340. The processor 310, the memory 320, the receiver(s) 330, and the sensor(s) 340 may be communicatively coupled to each other by a bus 345 (which may be configured, e.g., for optical and/or electrical communication). Even if referred to in the singular, the processor 310 may include one or more processors, the memory 320 may include one or more memories, the receiver(s) 330 may include one or more receivers, and/or the sensor(s) 340 may include one or more sensors. The receiver(s) 330 may include one or more antennas (e.g., the antenna(s) 254). One or more of the shown apparatus may be omitted from the autonomous vehicle 300. Also or alternatively, implementations of the vehicle 300 may include one or more devices (whether or not shown in FIG. 3), e.g., one or more transmitters 370 (including one or more antennas) that may be communicatively coupled to the processor 310, the memory 320, the receiver(s) 330, and the sensor(s) 340 by the bus 345.

The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 320 may be a non-transitory, processor-readable storage medium that may include random access memory (RAM)), flash memory, disc memory, and/or read-only memory (ROM), etc. The memory 320 may store the software 322 which may be processor-readable, processor-executable software code containing instructions that are configured to, when executed, cause the processor 310 to perform various functions described herein. Alternatively, the software 322 may not be directly executable by the processor 310 but may be configured to cause the processor 310, e.g., when compiled and executed, to perform the functions. While the description herein may focus on the autonomous vehicle 300, the description may apply to other mobile apparatus and/or one or more components thereof, e.g., a component of a mobile apparatus such as an ADAS (Advanced Driver Assistance System) engine. A mobile apparatus is an apparatus that is configured to be mobile, but at any given time may be in motion or stationary.

The description herein may refer to the processor 310 performing a function, but this may include other implementations such as where the processor 310 executes software and/or firmware. The description herein may refer to the processor 310 performing a function as shorthand for one or more of the processors contained in the processor 310 performing the function. The description herein may refer to the autonomous vehicle 300 performing a function as shorthand for one or more appropriate components (e.g., the processor 310 and the memory 320) of the autonomous vehicle 300 performing the function. The processor 310 may include a memory with stored instructions in addition to and/or instead of the memory 320. The processor 310 and/or the memory 320 may include a reliability unit 350 and may include a calibration/fault-mitigation unit 360. The reliability unit 350 and the calibration/fault-mitigation unit 360 are discussed further below, and the description may refer to the processor 310 generally, or the autonomous vehicle 300 generally, as performing any of the functions of the reliability unit 350 and/or the calibration/fault-mitigation unit 360, with the autonomous vehicle 300 being configured to perform the functions.

A perception system, e.g., of an RSU or a vehicle, may be configured to measure distance to vehicles, positions of vehicles (e.g., relative to roads), distances of vehicles to other objects (e.g., other vehicles), vehicle velocities, and/or vehicle directions. The perception system may combine (using a sensor fusion algorithm) sensor information at different stages to understand the environment of an ego vehicle, e.g., using collaborative perception and/or collaborative calibration. Collaboration may comprise early-stage collaboration, intermediate-stage collaboration, or late-stage collaboration. Early-stage collaboration uses raw sensor data among different vehicles, which uses a lot of C-V2X resources, but may provide high accuracy. With intermediate-stage collaboration, some level of preprocessing and fusion are performed on the raw sensor data before being sent to other vehicles. This uses less bandwidth than early-stage collaboration, with reduced accuracy. Whether to use early-stage or intermediate-stage collaboration may be based on an application of the sensor information. In late-stage collaboration, sensor data are processed and fused, e.g., object detection/classification is performed, and then the post-processed sensor information is sent which may use the least amount of bandwidth but may be very sensitive to timing and localization, which may make sensor calibration difficult.

Measured information may be sent to the vehicle 110, e.g., through a radio transmitter/C-V2X system along with a unique identifier, e.g., of the device containing the perception system. The information provided by the perception system may be used by the vehicle 110 as a source of information for calibrating one or more of the sensor(s) 340. The vehicle 110, which may be referred to as an ego vehicle (as the vehicle 110 is the center of attention for purposes of this description), may receive information from the perception system via the receiver(s) 330. The vehicle 110 may be configured to determine a distance from the vehicle 110 to the perception system, e.g., using one or more of the sensor(s) 340, e.g., radar, stereo cameras, lidar, etc. The vehicle 110 may be configured to implement an algorithm to obtain and publish (e.g., using the transmitter(s) 370) a list of most trusted sources of sensor information (e.g., sensors and/or devices each containing one or more sensors). The list of most trusted sources or sensor information may be used to determine sensor information to be used for calibration and/or perception. The vehicle 110 may be configured to implement a dynamic calibration algorithm to dynamically calibrate one or more of the sensor(s) 340 based on one or more reliable sources of sensor information, e.g., the most reliable sensor(s), available to the vehicle 110 (e.g., within communication range of the vehicle 110, and possibly within a threshold range of the vehicle 110). The vehicle 110 may be configured to implement fault mitigation to react to one or more sensor faults, e.g., to perform an MRM based on which sensor(s) failed and the severity of the failure(s).

The vehicle 110, e.g., the reliability unit 350, may be configured to identify proximate sources of reliable sensor information. For example, the vehicle 110 may have a high-definition (HD) map of the environment 100, including the RSUs 120, 121 stored in the memory 320. The reliability unit 350 may receive sensor information from the RSUs 120, 121 via the receiver(s) 330, along with the identification number of each RSU 120, 121 from which sensor information is received. The reliability unit 350 may determine a distance to each of the RSUs 120, 121, from which sensor information is received, using the HD map and a present location of the vehicle 110 (e.g., determined using the GNSS receiver 214). The reliability unit 350 may compare the distance to the RSU(s) determined using the HD map with distance(s) determined using signal(s) received from the RSU(s) and/or distance(s) determined by the vehicle 110 (e.g., using radar, lidar, and/or radio frequency sensing, and/or one or more other techniques). The reliability unit 350 may use the determined distance(s) to determine whether to consider sensor information from the respective RSU(s).

The reliability unit 350 may be configured to determine reliability of sensor information received from one or more other devices. For example, the reliability unit 350 may receive relative distance and velocity information from one or more other vehicles, e.g., the vehicles 111-113, via C-V2X communications. The reliability unit 350 may assess one or more factors for each source of sensor information, with different factors possibly being used for different sensor information sources, to determine reliability of received sensor information (e.g., direct reliability of the sensor(s) or indirect reliability of the sensor(s), e.g., reliability of a device containing the sensor(s) providing sensor information). For example, the reliability unit 350 may consider a model of a vehicle providing sensor information (a "source vehicle"), a mileage of the source vehicle, a software version of the source vehicle for determining and/or providing sensor information, a security integrity level of the source vehicle, and/or an ASIL of the source vehicle. The source vehicle may have an ASIL, which is a risk classification level or reliability level for the associated vehicle. For example, an ASIL D (level D) sensor may have a very low chance of failure. The reliability unit 350 may be configured to determine a respective weight for the sensor information from each sensor information source (e.g., a device containing the sensor(s) or one or more sensors, e.g., such that a single device may have multiple weights corresponding to respective sensor information (from different sensors or combinations of sensors)). The reliability unit 350 may be configured to determine a reliability order for different sensor information, e.g., which sensor information is the most reliable, the next most reliable, etc. The reliability unit 350 may be configured to determine whether sensor information from a device external to the vehicle 300 is more reliable than internal sensor information (i.e., sensor information sensed by the sensor(s) 340). The reliability unit 350 may be configured to identify and use external sensor information (i.e., sensor information from an external source) to calibrate one or more of the sensor(s) 340 based on the external sensor information being the most reliable external sensor information received and being more reliable than the internal sensor information. For example, the reliability unit 350 may be configured to identify and use external sensor information to calibrate one or more of the sensor(s) 340 only if the external sensor information is the most reliable external sensor information and is more reliable than corresponding internal sensor information.

The vehicle 300 may be configured to publish a list of the most reliable sensor information. For example, the reliability unit 350 may transmit, via the transmitter(s) 370, a list of most reliable sensor information sources (e.g., possibly including the vehicle 300, one or more of the sensor(s) 340, and/or one or more other devices, e.g., vehicles and/or RSUs and/or one or more sensors of one or more other devices). Also or alternatively, the reliability unit 350 may provide the list of most reliable sensor information sources to another portion of the vehicle 300. The vehicle 300 may be configured to weight the most reliable sensor information source(s) more heavily in a perception system of the vehicle 300.

An MRM (Minimum Risk Condition Maneuver) may be performed in response to significant sensor fault/failure. For example, the calibration/fault-mitigation unit 360 may be configured to implement an MRM in response to sensor fault/failure exceeding a threshold and/or in response to two calibrations of one or more sensors being required within a specified time window. The threshold for sensor fault/failure may be a variable threshold, e.g., being sensor dependent, situation dependent (e.g., a lower threshold if the vehicle 300 is at highway speed and thus there is less tolerance for sensor error).

Figure 4:
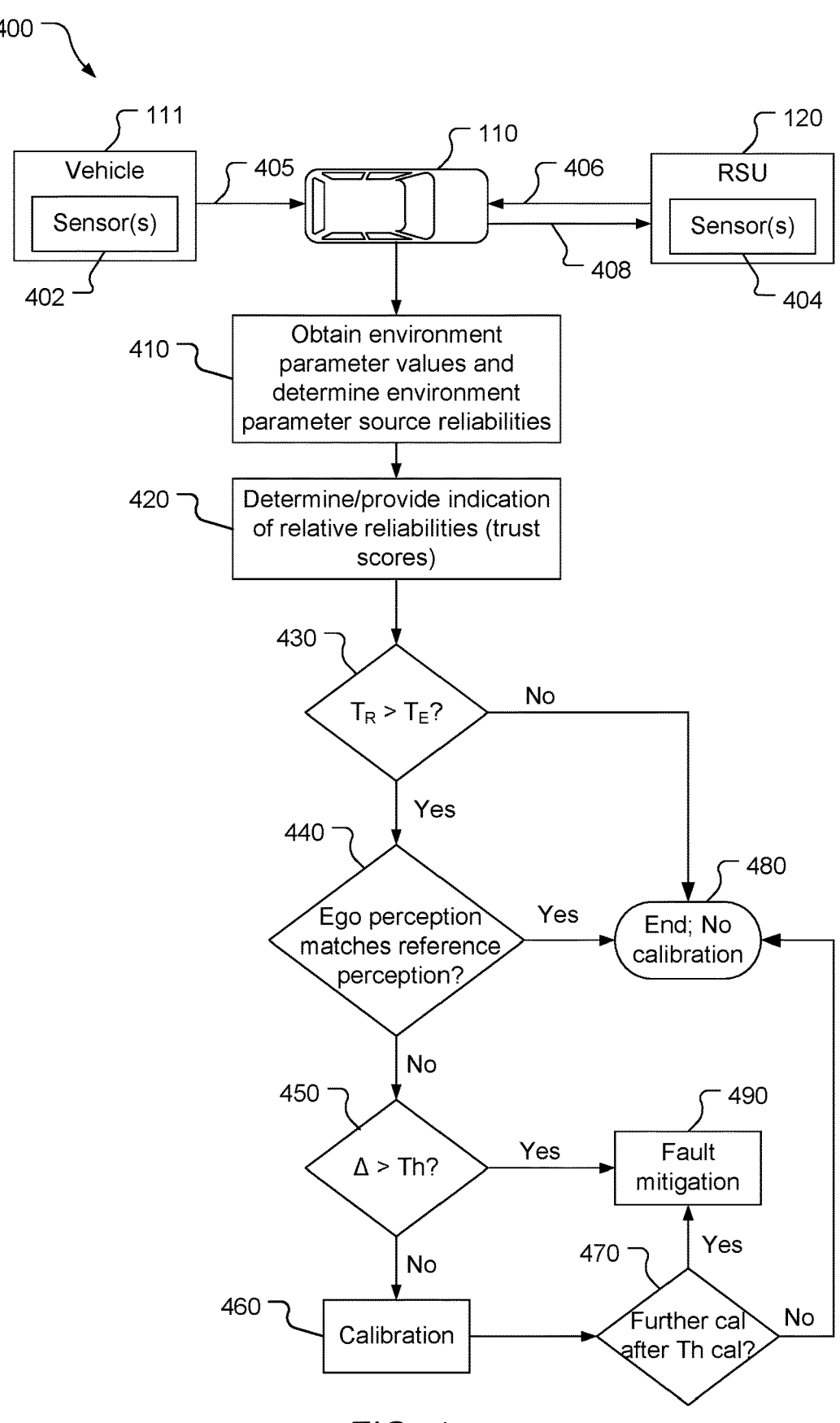
FIG. 4 is a block flow diagram of an example fault detection, calibration, and fault mitigation method.

Referring to FIG. 4, with further reference to FIGS. 1-3, a fault detection, calibration, and fault mitigation method 400 includes the stages shown. The method 400 is, however, an example only and not limiting. The method 400 may be altered, e.g., by having one or more stages added, removed, rearranged, combined, performed concurrently, and/or by having one or more single stages split into multiple stages. The method 400 shows, e.g., an example of how the calibration/fault-mitigation unit 360 determines to calibrate one or more of the sensors 340, and how the calibration/fault-mitigation unit 360 determines to perform fault mitigation.

At stage 410, the vehicle 110 (e.g., the reliability unit 350) obtains one or more environment parameter values and determines one or more corresponding environment parameter source reliabilities. The vehicle 110 may receive (via the receiver(s) 330) a communication 405 from the vehicle 111 (and/or one or more other vehicles) containing vehicle sensor information. The vehicle sensor information may comprise one or more raw sensor measurement values of one or more parameters of the environment 100 sensed by one or more sensors 402 of the vehicle 111 and/or may comprise one or processed sensor measurement values. For example, the vehicle 111 may provide vehicle sensor information such as source type, sensor type, source age, distance to the ego vehicle, source security integrity, relative distance between the vehicles 110, 111, speed of the vehicle 111 relative to the vehicle 110, direction of travel of the vehicle 111 relative to the vehicle 110, and/or one or more indications of one or more objects and corresponding location(s). Also or alternatively, the vehicle 110 may receive (via the receiver(s) 330) a communication 406 from the RSU 120 (and/or one or more other RSUs) containing RSU sensor information and one or more reliability factors associated with the RSU sensor information. The RSU sensor information may comprise one or more raw sensor measurement values of one or more parameters of the environment 100 sensed by one or more sensors 404 of the RSU 120 and/or may comprise one or processed sensor measurement values. For example, the RSU sensor information may comprise one or more vehicle positions, one or more vehicle speeds (e.g., absolute speed(s) and/or speed(s) relative to the vehicle 110), one or more vehicle directions (e.g., absolute and/or relative to the vehicle 110), and/or one or more indications of one or more objects and corresponding location(s).

Figure 5:
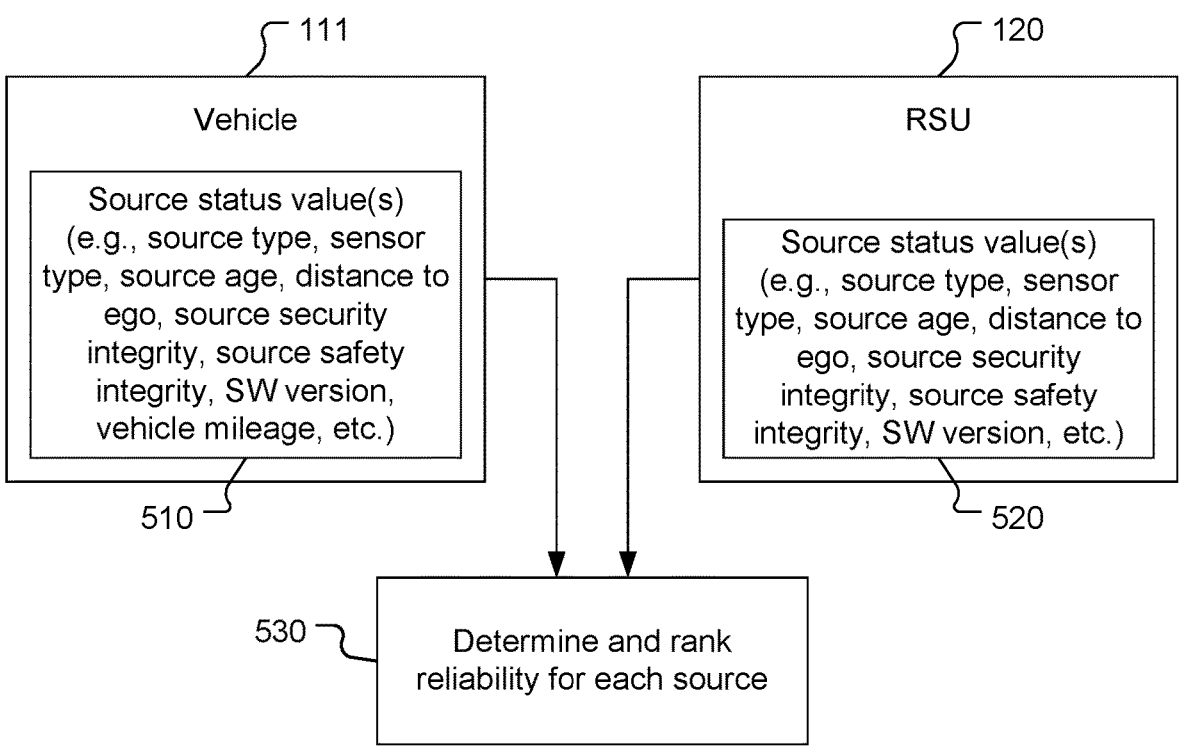
FIG. 5 is a block diagram of example communications from a vehicle and a roadside unit to an ego vehicle, and use by the ego vehicle to determine one or more reliabilities.

The communications 405, 406 may, respectively, include sensor information (e.g., sensor measurement(s)), identifying information regarding a source of the sensor information (e.g., a vehicle ID, an RSU ID), and may include information pertaining to one or more factors (discussed further below) for the reliability unit 350 to determine sensor information source reliability. For example, referring also to FIG. 5, the communication 405 may include one or more source status values 510 such as source type, sensor type, source age, distance to the ego vehicle source security integrity, source safety integrity, a software version of software that produced provided sensor information, vehicle mileage, etc. As another example, the communication 406 may include one or more source status values 520 including source type, sensor type, source age, distance to the ego vehicle source security integrity, source safety integrity, a software version of software that produced provided sensor information, etc.

The vehicle 110 may transmit a communication 408 to the RSU 120, e.g., indicating that the RSU 120 is visible to the vehicle 110. Any of the communications 405, 406, 408 may include multiple communications.

At stage 420, the reliability unit 350 may determine and provide an indication of relative reliabilities of sensor information received by the vehicle 110 and determined by the vehicle 110. For example, the source status value(s) 510, 520 may be used at stage 530 to determine and rank reliability for each source of sensor information. The reliability unit 350 may attempt to find a most reliable source of sensor information for each of one or more types of sensor information (e.g., distance to another vehicle, speed and/or direction of the vehicle 110, etc.). For example, the reliability unit 350 may receive i RSU sensor parameter values, may allocate a weight $a_i$ to each RSU sensor parameter value $RSU_i$ received from an RSU, and may weight the RSU sensor parameter value $RSU_i$ by multiplying the weight $a_i$ and the corresponding RSU sensor parameter value $RSU_i$. The weight $a_i$ may be considered to be a reliability of the corresponding sensor parameter value $RSU_i$. Similarly, the reliability unit 350 may receive j vehicle sensor parameter values, may allocate a weight $b_j$ to each vehicle sensor parameter value $V_j$ received from a vehicle, and may weight the vehicle sensor parameter value $V_j$ by multiplying the weight vi and the corresponding vehicle sensor parameter value $V_j$. The weight $b_j$ may be considered to be a reliability of the corresponding sensor parameter value $V_j$. The reliability unit 350 may determine the weight $a_i$ and the weight $b_j$ based on one or more factors associated with each respective sensor information source (e.g., RSU sensor(s), RSU, vehicle sensor(s), or vehicle) that may affect reliability, trustworthiness, and/or accuracy of the associated sensor information. For example, the reliability unit 350 may consider one or more of: source type (e.g., vehicle or RSU), an age of a sensor information source, an age of a device (e.g., RSU, vehicle) containing a sensor, distance to the sensor information source from the vehicle 110, an ASIL associated with the sensor (e.g., of a device containing the sensor), a security integrity level, a software version used to produce the sensor information, a model year of a vehicle (as appropriate), mileage of a vehicle (as appropriate), time since sensor calibration, etc. The reliability unit 350 may consider one or more other factors, and/or may consider fewer than all (or even none) of the factors listed to determine sensor information source reliability. The security integrity level may be an indication of a plausibility/consistency of sensor information, e.g., as determined by a security system that analyzes corresponding sensor measurement(s). The reliability unit 350 may, for example, be configured to determine a reference sensor information trust score $T_R$ (for external sensor information) for a type of sensor information as the highest reliability corresponding to the received sensor information for that sensor information type, i.e., $$T_R = \max(a_i, b_i) \text{ for } i = 1, 2, \ldots M \text{ and for } j = 1, 2, \ldots, N \qquad (1)$$

where M is the number of sensor information parameters, for a particular type of sensor information, received from RSUs and N is the number of sensor information parameters, of the particular type of sensor information, received from vehicles. The weights $a_i$, $b_j$ may be referred to as trust coefficients, and may, for example, have values between 0 and 1. Each trust coefficient may correspond to a single sensor or a combination of sensors (e.g., radar and lidar for the same vehicle). A trust coefficient may comprise a matrix of coefficients corresponding to multiple sensors. The value of M may be as little as zero, in which case $T_R$ will not depend on any reliability of any RSU sensor information. The value of N may be as little as zero, in which case $T_R$ will not depend on any reliability of any vehicle sensor information. The reliability unit 350 may determine one or more reliabilities (trust coefficients) for sensor information provided by the sensor(s) 340. The reliability unit 350 may determine a reliability cx for each type of sensor information and/or for each type of sensor information and corresponding sensor. For example, the reliability unit 350 may determine different reliabilities for distance to another vehicle determined by a radar of the vehicle 110 and the distance to the other vehicle determined by a lidar of the vehicle 110. The reliability unit 350 may, for example, be configured to determine an ego vehicle sensor information trust score $T_E$ (for internal sensor information) for a type of sensor information as the highest reliability corresponding to the received sensor information for that sensor information type, i.e., $$T_E = \max(c_{ik}) \text{ for } i = 1, 2, \ldots P \qquad (2)$$

where P is the number of the sensor(s) 340 that provide the sensor information type being assessed. The value of P may be as little as one.

At stage 430, the processor 310, e.g., the reliability unit 350, determines whether the reference trust score $T_R$ is higher than the ego vehicle sensor information trust score $T_E$. If the reference trust score $T_R$ is not higher than the ego vehicle sensor information trust score $T_E$, then the method 400 proceeds to stage 480 where the method 400 ends without calibration of the sensor(s) 340 corresponding to the sensor information being assessed. If the reference trust score $T_R$ is higher than the ego vehicle sensor information trust score $T_E$, then the external sensor information is a candidate for being used to calibrate one or more of the sensor(s) 340 and the method 400 proceeds to stage 440. The reliability unit 350 may provide a reliability indication indicating which environment parameter value (e.g., sensor value) is more reliable, e.g., the sensor value corresponding to which of the reference trust score $T_R$ and the vehicle sensor information trust score $T_E$ is higher.

At stage 440, the processor 310 may compare ego vehicle perception and an external reference device perception to determine whether the ego vehicle perception matches the reference device perception. For example, the processor 310 may determine whether a first sensor value corresponding to the reference trust score $T_R$ matches a second sensor value corresponding to the ego vehicle sensor information trust score $T_E$. If the first sensor value matches the second sensor value, then the method 400 may proceed to stage 480 because the ego vehicle sensor corresponding to the second sensor value is considered not to be in need of calibration. If the first sensor value does not match the second sensor value, then the method 400 may proceed to stage 450.

At stage 450, the processor 310 may determine whether the reliability of an ego sensor is below a threshold and, if so, request calibration of the ego sensor. For example, the processor 310 may determine whether a difference between a first sensor value corresponding to the reference trust score $T_R$ differs from a second sensor value corresponding to the ego vehicle sensor information trust score $T_E$ by more than a threshold amount. The threshold may depend on the type of sensor information being evaluated. If the first sensor value differs from the second sensor value by more than the threshold, then the method 400 may proceed to stage 490 (discussed further below) because the ego vehicle sensor is considered to have a major fault and to be uncorrectable by calibration. If the first sensor value is within the threshold relative to the second sensor value, then the method 400 may proceed to stage 460 because the ego vehicle sensor corresponding to the second sensor value is considered to be in need of calibration and correctable by calibration. If there are multiple ego vehicle sensors that provide similar sensor information (e.g., distance to another object), any such sensor whose sensor value differs from the more-reliable external reference sensor value (or a more-reliable internal sensor value) may be calibrated using the more-reliable sensor value. If there are multiple ego vehicle sensors that provide similar sensor information and any of such sensors becomes in need of calibration, then the sensor value(s) of the other sensor(s) that is (are) not in need of calibration (if any) may be weighted more heavily than the sensor value(s) of the sensor(s) in need of calibration, at least until the sensor(s) needing calibration is (are) calibrated successfully. Sensors may be ranked in order of importance such that the processor 310 will calibrate multiple sensors needing calibration in order of importance. Also or alternatively, sensors may be ranked in order of reliability and sensor values may be weighted as a function of sensor reliability, with sensor values from more-reliable sensors being weighted heavier than sensor values from less-reliable sensors, and possibly being considered to be ground truth.

At stage 460, the processor 310, e.g., the calibration/fault-mitigation unit 360, may calibrate the sensor whose sensor value was determined to differ from a more-reliable external sensor value. The calibration/fault-mitigation unit 360 may use the more-reliable external sensor value, i.e., the second sensor value discussed above with respect to stages 440, 450, to calibrate the appropriate sensor or sensors of the sensor(s) 340 such that a new value provided by the sensor(s) of the sensor(s) 340 will match or at least be within a tolerance threshold of the first sensor value discussed with respect to stages 440, 450. The method 400 may proceed to stage 470.

At stage 470, the processor 310, e.g., the calibration/fault-mitigation unit 360, may determine whether the ego vehicle sensor calibrated at stage 460 is in further need of calibration after having been calibrated a calibration threshold number of times, e.g., consecutively and/or within a specified time window. If the ego vehicle sensor is not in further need of calibration, then the method 400 may proceed to stage 480 where the method 400 ends without further calibration of the ego vehicle sensor. If at stage 470 the processor 310 determines that the ego vehicle sensor is in further need of calibration (e.g., the first sensor value differs by more than a calibrated second sensor value) after having been calibrated a calibration threshold number of times, then method 400 may proceed to stage 490.

At stage 480, the calibration/fault-mitigation unit 360 may determine whether a reliability of an ego sensor is below a threshold reliability. If the reliability of a first ego sensor is below the threshold reliability, and there is a second ego sensor for the same sensor information and whose reliability is above the threshold, then the calibration/fault-mitigation unit 360 may calibrate the first ego sensor using sensor information from the second ego sensor.

Figure 6:
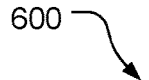
FIG. 6 is a block diagram of example sensor functions and corresponding autonomous driving functions.

At stage 490, the calibration/fault-mitigation unit 360 may perform fault mitigation, e.g., because at least one of the sensor(s) 340 is considered to have a major fault that is uncorrectable by calibration. Referring also to FIG. 6, the calibration/fault-mitigation unit 360 may assess which of the sensor(s) 340 is experiencing a major fault, and possibly how major of a fault, to determine which of multiple possible MRMs to perform. For example, a table 600 indicates failure types 610, failure combination types 620, and corresponding autonomous driving features 630 that are lost based on corresponding the corresponding failure type 610 and failure combination type 620 (if any) occurring. In the example of the table 600, an ability to keep a safe distance at high speed will be lost if a long-range camera fails in combination with a long-range radar failing. Also in the example of the table 600, an ability to safely change lanes will be lost if a port-side short-range radar sensor fails in combination with a side camera failing. Also in the example of the table 600, an ability to safely maintain the vehicle 300 within a lane will be lost if a lane-following camera fails.

Figure 7:
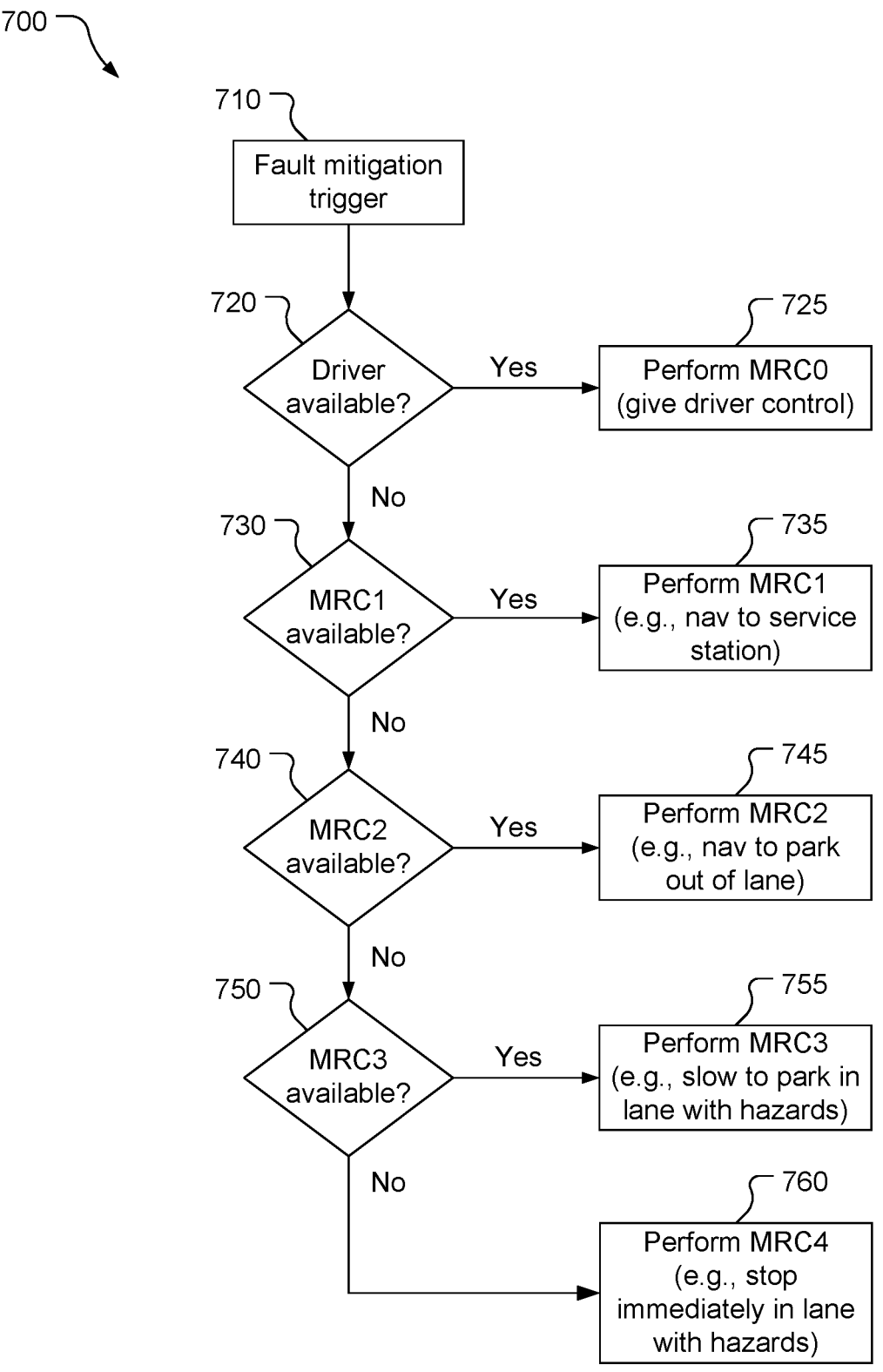
FIG. 7 is a block diagram of an example fault mitigation method.

Referring also to FIG. 7, a fault mitigation method 700 includes the stages shown. The method 700 is, however, an example only and not limiting. The method 700 may be altered, e.g., by having one or more stages added, removed, rearranged, combined, performed concurrently, and/or by having one or more single stages split into multiple stages.

At stage 710, the calibration/fault-mitigation unit 360 may receive a fault mitigation trigger. For example, the calibration/fault-mitigation unit 360 may provide a fault mitigation trigger in response to determining at stage 450 that the difference in sensor values exceeds the threshold, or in response to determining at stage 470 that further ego vehicle sensor calibration is needed after a threshold number of calibrations of the same ego vehicle sensor.

At stage 720, the calibration/fault-mitigation unit 360 may determine whether there is a driver available for the vehicle 300. If there is a driver available, then the method 700 may proceed to stage 725 where the calibration/fault-mitigation unit 360 may perform an MRC0 operation. The calibration/fault-mitigation unit 360 will perform the MRC0 operation by providing control of the vehicle 300 to the driver. If there is no driver available (or at least the calibration/fault-mitigation unit 360 does not determine that there is a driver available), then the method 700 proceeds to stage 730.

At stage 730, the calibration/fault-mitigation unit 360 may determine whether the vehicle 300 can perform an MRC1 operation, e.g., has appropriate operational components (e.g., sensors with sufficient accuracy, operational steering control, operational navigation system) in order to perform the MRC1 operation. If the vehicle 300 is in condition to perform the MRC1 operation, then the method 700 may proceed to stage 735 where the calibration/fault-mitigation unit 360 will perform the MRC1 operation by reducing the speed of the vehicle 300 and navigating the vehicle 300 to a repair station, e.g., the nearest repair station within a threshold distance (e.g., 20 miles, 30 km) of the vehicle 300. If the MRC1 operation cannot be performed, then the method 700 proceeds to stage 740.

At stage 740, the calibration/fault-mitigation unit 360 may determine whether the vehicle 300 can perform an MRC2 operation, e.g., has appropriate operational components (e.g., sensors with sufficient accuracy, operational steering control, operational navigation system) in order to perform the MRC2 operation. If the vehicle 300 is in condition to perform the MRC2 operation, then the method 700 may proceed to stage 745 where the calibration/fault-mitigation unit 360 will perform the MRC2 operation by reducing the speed of the vehicle 300 and navigating to a safe area, e.g., a nearest safe area off of the road 130 (e.g., a road shoulder, a parking lot), and stopping/parking the vehicle 300. If the MRC2 operation cannot be performed, then the method 700 proceeds to stage 750.

At stage 750, the calibration/fault-mitigation unit 360 may determine whether the vehicle 300 can perform an MRC3 operation, e.g., has appropriate operational components (e.g., sensors with sufficient accuracy, operational lane maintenance system) in order to perform the MRC3 operation. If the vehicle 300 is in condition to perform the MRC3 operation, then the method 700 may proceed to stage 755 where the calibration/fault-mitigation unit 360 will perform the MRC3 operation by actuating hazard signals (e.g., hazard lights) of the vehicle, and gradually reducing the speed of the vehicle 300 (e.g., without leaving a present lane of travel) to a full stop. If the MRC3 operation cannot be performed, then the method 700 proceeds to stage 760.

At stage 760, the calibration/fault-mitigation unit 360 will perform an MRC4 operation. To perform the MRC 4 operation, the calibration/fault-mitigation unit 360 will actuate hazard signals (e.g., hazard lights) of the vehicle and stop the vehicle 300 immediately.

Referring to FIG. 8, with further reference to FIGS. 1-6, an environment perception method 800 includes the stages shown. The method 800 is, however, an example only and not limiting. The method 800 may be altered, e.g., by having one or more stages added, removed, rearranged, combined, performed concurrently, and/or by having one or more single stages split into multiple stages.

At stage 810, the method 800 includes receiving, at an ego vehicle from a device external to the ego vehicle, one or more first reliability factors associated with the device and with a first value of a parameter of an environment containing the ego vehicle. For example, the processor 310 may receive the communication 405 and/or the communication 406, with the communication(s) 405, 406 including one or more reliability factors each corresponding to a respective device (e.g., the vehicle 111 or the RSU 120) and each associated with an environmental parameter value or a value, e.g., a measured value (e.g., from one or more of the sensor(s) 402 or from one or more of the sensor(s) 404), from which the environmental parameter value may be determined. The processor 310, possibly in combination with the memory 320, in combination with the receiver(s) 330 may comprise means for receiving the one or more first reliability factors.

At stage 820, the method 800 includes determining, at the ego vehicle based on the one or more first reliability factors, a first reliability of the first value of the parameter. For example, the processor 310 may determine an appropriate one of the weights (reliabilities, trust coefficients) $a_i$, $b_i$. The processor 310, possibly in combination with the memory 320, may comprise means for determining the first reliability.

At stage 830, the method 800 includes determining, at the ego vehicle based on one or more second reliability factors associated with the ego vehicle and with a second value of the parameter of the environment provided by one or more sensors of the ego vehicle, a second reliability of the second value of the parameter of the environment. For example, the processor 310, e.g., the reliability unit 350, may determine the reliability ci for a corresponding environment parameter value. The processor 310, possibly in combination with the memory 320, may comprise means for determining the second reliability.

At stage 840, the method 800 includes providing, by the ego vehicle, a reliability indication indicating which of the first value of the parameter of the environment and the second value of the parameter of the environment is more reliable based on which of the first reliability and the second reliability is a higher reliability. For example, the processor 310 may provide (internally to the vehicle 300 and/or externally to the vehicle 300) an indication of which parameter value associated with a respective one of the reliabilities is more reliable. The indication may identify a source of the parameter value and/or may provide the parameter value. The indication may be explicit and/or implicit (e.g., an indication to use the parameter value determined to be more reliable in determining a perception of the environment of the ego vehicle). The processor 310, possibly in combination with the memory 320, possibly in combination with the transmitter(s) 370 may comprise means for providing the reliability indication.

Implementations of the method 800 may include one or more of the following features. In an example implementation, the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof. In another example implementation, the method 800 includes: receiving, at the ego vehicle, the first value of the parameter of the environment; determining, at the ego vehicle based on one or more measurements from the one or more sensors, the second value of the parameter of the environment; and determining, at the ego vehicle, a perception of the environment based on the first value of the parameter of the environment and the second value of the parameter of the environment, while giving more weight to the one of the first value of the parameter of the environment and the second value of the parameter of the environment that is more reliable. For example, the processor 310 may receive the first parameter value as part of one of the communications 405, 406. The processor 310 may determine the second parameter value based on one or more measurements from the sensor(s) 340 (e.g., received directly from the sensor(s) 340 and/or retrieved from the memory 320). The second parameter value may be determined from one of the sensor(s) 340 or from a combination of more than one of the sensor(s) 340, e.g., multiple sensors that provide information regarding the same parameter (e.g., distance from the ego vehicle to another object, or relative velocity of the other object, etc.). The processor 310 may implement a perception system and use the first parameter value and the second parameter value to perceive the environment 100 while weighting more heavily the more reliable of the first and second parameter values. The processor 310, possibly in combination with the memory 320, in combination with the receiver(s) 330 may comprise means for receiving the first value of the parameter. The processor 310, possibly in combination with the memory 320, in combination with the sensor(s) 340 may comprise means for receiving the second value of the parameter. The processor 310, possibly in combination with the memory 320, may comprise means for determining the perception of the environment (e.g., distance to an object from the ego vehicle, velocity of the object relative to the ego vehicle, etc.).

Also or alternatively, implementations of the method 800 may include one or more of the following features. In an example implementation, the method 800 includes: receiving, at the ego vehicle, the first value of the parameter of the environment; determining, at the ego vehicle based on one or more measurements from the one or more sensors, the second value of the parameter of the environment; and calibrating, at the ego vehicle, at least one of the one or more sensors using the first value of the parameter of the environment, based on the reliability indication indicating that the first value of the parameter of the environment is more reliable than the second value of the parameter of the environment. The first and second values of the parameter may be received and determined as discussed above. The processor 310, e.g., the calibration/fault-mitigation unit 360, may calibrate one or more of the sensor(s) 340 based on the first parameter value (obtained from outside of the vehicle 300) being more reliable than the second parameter value (obtained internally to the vehicle 300 from the sensor(s) 340). The processor 310, possibly in combination with the memory 320, may comprise means for calibrating the at least one of the one or more sensors. In a further example implementation, calibrating the at least one of the one or more sensors is further based on the first value of the parameter of the environment differing by less than a threshold amount from the second value of the parameter of the environment. For example, the processor 310, e.g., the calibration/fault-mitigation unit 360, may calibrate the sensor(s) based on an external and internal parameter value difference, e.g., as determined at stage 450, being less than a threshold difference, indicating that the sensor(s) is out of calibration but correctable through calibration.

Also or alternatively, implementations of the method 800 may include one or more of the following features. In an example implementation, the method 800 includes: receiving, at the ego vehicle, the first value of the parameter of the environment; determining, at the ego vehicle based on one or more measurements from the one or more sensors, the second value of the parameter of the environment; and performing, at the ego vehicle, fault mitigation based on the reliability indication indicating that the first value of the parameter of the environment is more reliable than the second value of the parameter of the environment, and based on the first value of the parameter of the environment differing by more than a threshold amount from the second value of the parameter of the environment. The first and second values of the parameter may be received and determined as discussed above. The processor 310, e.g., the calibration/fault-mitigation unit 360, may perform fault mitigation, e.g., at stage 490, based on an externally-determined parameter value being more reliable than an internally-determined value of the parameter, and the two values differing by more than a threshold, e.g., as determined at stage 450, indicating that one or more of the sensor(s) 340 is failing (e.g., being out of calibration or experiencing a more severe failure) and not correctable through calibration. The fault mitigation may comprise instructing one or more components of the vehicle 300 to perform one or more corresponding operations (e.g., steering the vehicle 300, braking, actuating emergency indicators, etc.). The processor 310, possibly in combination with the memory 320, may comprise means for performing fault mitigation. In a further example implementation, performing the fault mitigation comprises performing one of a hierarchy of fault mitigation operations based on availability of a driver or availability of one or more resources of the ego vehicle. For example, the processor 310, e.g., the calibration/fault-mitigation unit 360, may implement the method 700 to determine an appropriate fault mitigation operation to perform and causing the appropriate fault mitigation operation to be performed. In a further example implementation, a highest priority of the hierarchy of fault mitigation operations comprises providing driving control of the ego vehicle to the driver. For example, the first fault mitigation operation that the processor 310 may attempt to implement is providing, at stage 725, a driver control of the vehicle 300.

Also or alternatively, implementations of the method 800 may include one or more of the following features. In an example implementation, the method 800 includes: receiving the one or more first reliability factors comprises receiving, for each of a plurality of devices external to the ego vehicle, one or more respective first reliability factors; determining the first reliability comprises determining a plurality of first reliabilities each corresponding to a respective one of the plurality of devices and a respective first value of the parameter of the environment, and each based on the one or more respective first reliability factors; and providing the reliability indication comprises providing an indication of one or more most reliable values of the parameter of the environment based on the plurality of first reliabilities and the second reliability. For example, the processor 310 may receive the communication 405 and/or the communication 406, for at least two devices (e.g., two vehicles, two RSUs, a vehicle and an RSU, etc.), including one or more reliability factors for each of the devices. The processor 310, e.g., the reliability unit 350, may use the appropriate reliability factor(s) to determine a reliability for each combination of device and value of the parameter of the environment. The processor 310, e.g., the reliability unit 350, may provide (internally and/or externally to the vehicle 300) a list of most reliable values of the parameter. The processor 310, possibly in combination with the memory 320, in combination with the receiver(s) 330 may comprise means for receiving the one or more respective first reliability factors. The processor 310, possibly in combination with the memory 320, may comprise means for determining the first reliability. The processor 310, possibly in combination with the memory 320, possibly in combination with the transmitter(s) 370 may comprise means for providing the reliability indication. In a further example implementation, providing the indication of the one or more most reliable values of the parameter of the environment comprises transmitting, from the ego vehicle, a list of most reliable values of the parameter of the environment with indications of relative reliabilities. The indications of relative reliabilities may be explicit (e.g., reliability values provided corresponding to each value of the parameter) and/or implicit (e.g., based on an order of the values of the parameter in the list).

IMPLEMENTATION EXAMPLES

Implementation examples are provided in the following numbered clauses.

Clause 1. An environment perception system, of an ego vehicle, comprising:
- one or more sensors;
- one or more receivers;
- one or more memories; and
- one or more processors communicatively coupled to the one or more sensors, the one or more receivers, and the one or more memories, the one or more processors being configured to:
  - receive, via the one or more receivers from a device external to the ego vehicle, one or more first reliability factors associated with the device and with a first value of a parameter of an environment containing the ego vehicle;
  - determine, based on the one or more first reliability factors, a first reliability of the first value of the parameter;
  - determine, based on one or more second reliability factors associated with the ego vehicle and with a second value of the parameter of the environment provided by the one or more sensors, a second reliability of the second value of the parameter of the environment; and
  - provide a reliability indication indicating which of the first value of the parameter of the environment and the second value of the parameter of the environment is more reliable based on which of the first reliability and the second reliability is a higher reliability.

Clause 2. The environment perception system of clause 1, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

Clause 3. The environment perception system of clause 1, wherein the one or more processors are configured to:
- receive, via the one or more receivers, the first value of the parameter of the environment;
- determine, based on one or more measurements from the one or more sensors, the second value of the parameter of the environment; and
- determine a perception of the environment based on the first value of the parameter of the environment and the second value of the parameter of the environment, while giving more weight to the one of the first value of the parameter of the environment and the second value of the parameter of the environment that is more reliable.

Clause 4. The environment perception system of clause 1, wherein the one or more processors are configured to:
- receive, via the one or more receivers, the first value of the parameter of the environment;
- determine, based on one or more measurements from the one or more sensors, the second value of the parameter of the environment; and
- calibrate at least one of the one or more sensors using the first value of the parameter of the environment, based on the reliability indication indicating that the first value of the parameter of the environment is more reliable than the second value of the parameter of the environment.

Clause 5. The environment perception system of clause 4, wherein the one or more processors are configured to calibrate the at least one of the one or more sensors, using the first value of the parameter of the environment, based further on the first value of the parameter of the environment differing by less than a threshold amount from the second value of the parameter of the environment.

Clause 6. The environment perception system of clause 1, wherein the one or more processors are configured to:
- receive, via the one or more receivers, the first value of the parameter of the environment;
- determine, based on one or more measurements from the one or more sensors, the second value of the parameter of the environment; and
- perform fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

Clause 7. The environment perception system of clause 6, wherein to perform the fault mitigation the one or more processors are configured to perform one of a hierarchy of fault mitigation operations based on availability of a driver or availability of one or more resources of the ego vehicle.

Clause 8. The environment perception system of clause 7, wherein a highest priority of the hierarchy of fault mitigation operations comprises providing driving control of the ego vehicle to the driver.

Clause 9. The environment perception system of clause 1, wherein:

to receive the one or more first reliability factors the one or more processors are configured to receive, via the one or more receivers for each of a plurality of devices external to the ego vehicle, one or more respective first reliability factors;

to determine the first reliability the one or more processors are configured to determine a plurality of first reliabilities each corresponding to a respective one of the plurality of devices and a respective first value of the parameter of the environment, and each based on the one or more respective first reliability factors; and to provide the reliability indication, the one or more processors are configured to provide an indication of one or more most reliable values of the parameter of the environment based on the plurality of first reliabilities and the second reliability.

Clause 10. The environment perception system of clause 9, further comprising one or more transmitters communicatively coupled to the one or more processors, wherein to provide the indication of the one or more most reliable values of the parameter of the environment, the one or more processors are configured to transmit, via the one or more transmitters, a list of most reliable values of the parameter of the environment with indications of relative reliabilities.

Clause 11. An environment perception method comprising:

receiving, at an ego vehicle from a device external to the ego vehicle, one or more first reliability factors associated with the device and with a first value of a parameter of an environment containing the ego vehicle;

determining, at the ego vehicle based on the one or more first reliability factors, a first reliability of the first value of the parameter;

determining, at the ego vehicle based on one or more second reliability factors associated with the ego vehicle and with a second value of the parameter of the environment provided by one or more sensors of the ego vehicle, a second reliability of the second value of the parameter of the environment; and providing, by the ego vehicle, a reliability indication indicating which of the first value of the parameter of the environment and the second value of the parameter of the environment is more reliable based on which of the first reliability and the second reliability is a higher reliability.

Clause 12. The environment perception method of clause 11, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

Clause 13. The environment perception method of clause 11, further comprising:

receiving, at the ego vehicle, the first value of the parameter of the environment;

determining, at the ego vehicle based on one or more measurements from the one or more sensors, the second value of the parameter of the environment; and determining, at the ego vehicle, a perception of the environment based on the first value of the parameter of the environment and the second value of the parameter of the environment, while giving more weight to the one of the first value of the parameter of the environment and the second value of the parameter of the environment that is more reliable.

Clause 14. The environment perception method of clause 11, further comprising:

receiving, at the ego vehicle, the first value of the parameter of the environment;

determining, at the ego vehicle based on one or more measurements from the one or more sensors, the second value of the parameter of the environment; and calibrating, at the ego vehicle, at least one of the one or more sensors using the first value of the parameter of the environment, based on the reliability indication indicating that the first value of the parameter of the environment is more reliable than the second value of the parameter of the environment.

Clause 15. The environment perception method of clause 14, wherein the calibrating the at least one of the one or more sensors is further based on the first value of the parameter of the environment differing by less than a threshold amount from the second value of the parameter of the environment.

Clause 16. The environment perception method of clause 11, further comprising:

receiving, at the ego vehicle, the first value of the parameter of the environment;

determining, at the ego vehicle based on one or more measurements from the one or more sensors, the second value of the parameter of the environment; and performing, at the ego vehicle, fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

Clause 17. The environment perception method of clause 16, wherein performing the fault mitigation comprises performing one of a hierarchy of fault mitigation operations based on availability of a driver or availability of one or more resources of the ego vehicle.

Clause 18. The environment perception method of clause 17, wherein a highest priority of the hierarchy of fault mitigation operations comprises providing driving control of the ego vehicle to the driver.

Clause 19. The environment perception method of clause 11, wherein:

receiving the one or more first reliability factors comprises receiving, for each of a plurality of devices external to the ego vehicle, one or more respective first reliability factors;

determining the first reliability comprises determining a plurality of first reliabilities each corresponding to a respective one of the plurality of devices and a respective first value of the parameter of the environment, and each based on the one or more respective first reliability factors; and providing the reliability indication comprises providing an indication of one or more most reliable values of the parameter of the environment based on the plurality of first reliabilities and the second reliability.

Clause 20. The environment perception method of clause 19, wherein providing the indication of the one or more most reliable values of the parameter of the environment comprises transmitting, from the ego vehicle, a list of most reliable values of the parameter of the environment with indications of relative reliabilities.

Clause 21. An environment perception system, of an ego vehicle, comprising:

means for receiving, from a device external to the ego vehicle, one or more first reliability factors associated with the device and with a first value of a parameter of an environment containing the ego vehicle;

means for determining, based on the one or more first reliability factors, a first reliability of the first value of the parameter;

means for determining, based on one or more second reliability factors associated with the ego vehicle and with a second value of the parameter of the environment provided by one or more sensors of the ego vehicle, a second reliability of the second value of the parameter of the environment; and means for providing a reliability indication indicating which of the first value of the parameter of the environment and the second value of the parameter of the environment is more reliable based on which of the first reliability and the second reliability is a higher reliability.

Clause 22. The environment perception system of clause 21, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

Clause 23. The environment perception system of clause 21, further comprising:

means for receiving the first value of the parameter of the environment;

means for determining, based on one or more measurements from the one or more sensors, the second value of the parameter of the environment; and means for determining a perception of the environment based on the first value of the parameter of the environment and the second value of the parameter of the environment, while giving more weight to the one of the first value of the parameter of the environment and the second value of the parameter of the environment that is more reliable.

Clause 24. The environment perception system of clause 21, further comprising:

means for receiving the first value of the parameter of the environment;

means for determining, based on one or more measurements from the one or more sensors, the second value of the parameter of the environment; and means for calibrating at least one of the one or more sensors using the first value of the parameter of the environment, based on the reliability indication indicating that the first value of the parameter of the environment is more reliable than the second value of the parameter of the environment.

Clause 25. The environment perception system of clause 24, wherein the means for calibrating the at least one of the one or more sensors are for calibrating the at least one of the one or more sensors based further on the first value of the parameter of the environment differing by less than a threshold amount from the second value of the parameter of the environment.

Clause 26. The environment perception system of clause 21, further comprising:

means for receiving the first value of the parameter of the environment;

means for determining, based on one or more measurements from the one or more sensors, the second value of the parameter of the environment; and means for performing fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

Clause 27. The environment perception system of clause 26, wherein the means for performing the fault mitigation comprise means for performing one of a hierarchy of fault mitigation operations based on availability of a driver or availability of one or more resources of the ego vehicle.

Clause 28. The environment perception system of clause 27, wherein a highest priority of the hierarchy of fault mitigation operations comprises providing driving control of the ego vehicle to the driver.

Clause 29. The environment perception system of clause 21, wherein:

the means for receiving the one or more first reliability factors comprise means for receiving, for each of a plurality of devices external to the ego vehicle, one or more respective first reliability factors;

the means for determining the first reliability comprise means for determining a plurality of first reliabilities each corresponding to a respective one of the plurality of devices and a respective first value of the parameter of the environment, and each based on the one or more respective first reliability factors; and the means for providing the reliability indication comprise means for providing an indication of one or more most reliable values of the parameter of the environment based on the plurality of first reliabilities and the second reliability.

Clause 30. The environment perception system of clause 29, wherein the means for providing the indication of the one or more most reliable values of the parameter of the environment comprise means for transmitting, from the ego vehicle, a list of most reliable values of the parameter of the environment with indications of relative reliabilities.

Clause 31. A non-transitory, processor-readable storage medium comprising processor-readable instructions to cause one or more processors of an ego vehicle to:

receive, from a device external to the ego vehicle, one or more first reliability factors associated with the device and with a first value of a parameter of an environment containing the ego vehicle;

determine, based on the one or more first reliability factors, a first reliability of the first value of the parameter;

determine, based on one or more second reliability factors associated with the ego vehicle and with a second value of the parameter of the environment provided by one or more sensors of the ego vehicle, a second reliability of the second value of the parameter of the environment; and provide a reliability indication indicating which of the first value of the parameter of the environment and the second value of the parameter of the environment is more reliable based on which of the first reliability and the second reliability is a higher reliability.

Clause 32. The non-transitory, processor-readable storage medium of clause 31, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

Clause 33. The non-transitory, processor-readable storage medium of clause 31, further comprising processor-readable instructions to cause the one or more processors to:

receive the first value of the parameter of the environment;

determine, based on one or more measurements from the one or more sensors, the second value of the parameter of the environment; and determine a perception of the environment based on the first value of the parameter of the environment and the second value of the parameter of the environment, while giving more weight to the one of the first value of the parameter of the environment and the second value of the parameter of the environment that is more reliable.

Clause 34. The non-transitory, processor-readable storage medium of clause 31, further comprising processor-readable instructions to cause the one or more processors to:

receive the first value of the parameter of the environment;

determine, based on one or more measurements from the one or more sensors, the second value of the parameter of the environment; and calibrate at least one of the one or more sensors using the first value of the parameter of the environment, based on the reliability indication indicating that the first value of the parameter of the environment is more reliable than the second value of the parameter of the environment.

Clause 35. The non-transitory, processor-readable storage medium of clause 34, wherein the processor-readable instructions to cause the one or more processors to calibrate the at least one of the one or more sensors comprise processor-readable instructions to cause the one or more processors to calibrate the at least one of the one or more sensors based further on the first value of the parameter of the environment differing by less than a threshold amount from the second value of the parameter of the environment.

Clause 36. The non-transitory, processor-readable storage medium of clause 31, further comprising processor-readable instructions to cause the one or more processors to:

receive the first value of the parameter of the environment;

determine, based on one or more measurements from the one or more sensors, the second value of the parameter of the environment; and perform fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

Clause 37. The non-transitory, processor-readable storage medium of clause 36, wherein the processor-readable instructions to cause the one or more processors to perform the fault mitigation comprise processor-readable instructions to cause the one or more processors to perform one of a hierarchy of fault mitigation operations based on availability of a driver or availability of one or more resources of the ego vehicle.

Clause 38. The non-transitory, processor-readable storage medium of clause 37, wherein a highest priority of the hierarchy of fault mitigation operations comprises providing driving control of the ego vehicle to the driver.

Clause 39. The non-transitory, processor-readable storage medium of clause 31, wherein:

the processor-readable instructions to cause the one or more processors to receive the one or more first reliability factors comprise processor-readable instructions to cause the one or more processors to receiving, for each of a plurality of devices external to the ego vehicle, one or more respective first reliability factors;

the processor-readable instructions to cause the one or more processors to determine the first reliability comprise processor-readable instructions to cause the one or more processors to determine a plurality of first reliabilities each corresponding to a respective one of the plurality of devices and a respective first value of the parameter of the environment, and each based on the one or more respective first reliability factors; and the processor-readable instructions to cause the one or more processors to provide the reliability indication comprise processor-readable instructions to cause the one or more processors to provide an indication of one or more most reliable values of the parameter of the environment based on the plurality of first reliabilities and the second reliability.

Clause 40. The non-transitory, processor-readable storage medium of clause 39, wherein the processor-readable instructions to cause the one or more processors to provide the indication of the one or more most reliable values of the parameter of the environment comprise processor-readable instructions to cause the one or more processors to transmit, from the ego vehicle, a list of most reliable values of the parameter of the environment with indications of relative reliabilities.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X. or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. An environment perception system, of an ego vehicle, comprising:
   one or more sensors;
   one or more receivers;
   one or more memories; and
   one or more processors communicatively coupled to the one or more sensors, the one or more receivers, and the one or more memories, the one or more processors being configured to:
   receive, via the one or more receivers from a device external to the ego vehicle, a plurality of first reliability factors associated with the device and with a first value of a parameter of an environment containing the ego vehicle;
   determine, based on the plurality of first reliability factors, a first reliability trust score of the first value of the parameter;
   determine, based on a plurality of second reliability factors associated with the ego vehicle and with a second value of the parameter of the environment provided by the one or more sensors, a second reliability trust score of the second value of the parameter of the environment;
   provide a reliability indication indicating which of the first value of the parameter of the environment and the second value of the parameter of the environment is more reliable based on which of the first reliability trust score and the second reliability trust score indicates a higher reliability; and perform, based on the reliability indication, at least one autonomous driving operation comprising at least one of:
   calibrating at least a first one of the one or more sensors using the first value of the parameter of the environment based on the first trust score indicating higher reliability than the second trust score; and
   evaluating an environment near the ego vehicle using at least a second one of the one or more sensors without calibrating the second one of the one or more sensors based on the second trust score indicating higher reliability than the first trust score.

2. The environment perception system of claim 1, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

3. The environment perception system of claim 1, wherein the one or more processors are configured to:
   receive, via the one or more receivers, the first value of the parameter of the environment;
   determine, based on one or more measurements from the one or more sensors, the second value of the parameter of the environment; and
   determine a perception of the environment based on the first value of the parameter of the environment and the second value of the parameter of the environment, while giving more weight to the one of the first value of the parameter of the environment and the second value of the parameter of the environment that is more reliable.

4. The environment perception system of claim 1, wherein the one or more processors are configured to:
   receive, via the one or more receivers, the first value of the parameter of the environment;
   determine, based on one or more measurements from the one or more sensors, the second value of the parameter of the environment; and
   calibrate at least one of the one or more sensors using the first value of the parameter of the environment, based on the reliability indication indicating that the first value of the parameter of the environment is more reliable than the second value of the parameter of the environment.

5. The environment perception system of claim 4, wherein the one or more processors are configured to calibrate the at least one of the one or more sensors, using the first value of the parameter of the environment, based further on the first value of the parameter of the environment differing by less than a threshold amount from the second value of the parameter of the environment.

6. The environment perception system of claim 1, wherein the one or more processors are configured to:

receive, via the one or more receivers, the first value of the parameter of the environment;

determine, based on one or more measurements from the one or more sensors, the second value of the parameter of the environment; and perform fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

7. The environment perception system of claim 6, wherein to perform the fault mitigation the one or more processors are configured to perform one of a hierarchy of fault mitigation operations based on availability of a driver or availability of one or more resources of the ego vehicle.

8. The environment perception system of claim 7, wherein a highest priority of the hierarchy of fault mitigation operations comprises providing driving control of the ego vehicle to the driver.

9. The environment perception system of claim 1, wherein:

to receive the one or more first reliability factors the one or more processors are configured to receive, via the one or more receivers for each of a plurality of devices external to the ego vehicle, one or more respective first reliability factors;

to determine the first reliability the one or more processors are configured to determine a plurality of first reliabilities each corresponding to a respective one of the plurality of devices and a respective first value of the parameter of the environment, and each based on the one or more respective first reliability factors; and to provide the reliability indication, the one or more processors are configured to provide an indication of one or more most reliable values of the parameter of the environment corresponding to one or more highest reliabilities of the plurality of first reliabilities and the second reliability.

10. The environment perception system of claim 9, further comprising one or more transmitters communicatively coupled to the one or more processors, wherein to provide the indication of the one or more most reliable values of the parameter of the environment, the one or more processors are configured to transmit, via the one or more transmitters, a list of most reliable values of the parameter of the environment with indications of relative reliabilities.

11. An environment perception method comprising:

receiving, at an ego vehicle from a device external to the ego vehicle, a plurality of first reliability factors associated with the device and with a first value of a parameter of an environment containing the ego vehicle;

determining, at the ego vehicle based on the plurality of first reliability factors, a first reliability trust score of the first value of the parameter;

determining, at the ego vehicle based on a plurality of second reliability factors associated with the ego vehicle and with a second value of the parameter of the environment provided by one or more sensors of the ego vehicle, a second reliability trust score of the second value of the parameter of the environment;

providing, by the ego vehicle, a reliability indication indicating which of the first value of the parameter of the environment and the second value of the parameter of the environment is more reliable based on which of the first reliability trust score and the second reliability trust score indicates a higher reliability; and performing, based on the reliability indication, at least one autonomous driving operation comprising at least one of:

calibrating at least a first one of the one or more sensors using the first value of the parameter of the environment based on the first trust score indicating higher reliability than the second trust score; and evaluating an environment near the ego vehicle using at least a second one of the one or more sensors without calibrating the second one of the one or more sensors based on the second trust score indicating higher reliability than the first trust score.

12. The environment perception method of claim 11, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

13. The environment perception method of claim 11, further comprising:

receiving, at the ego vehicle, the first value of the parameter of the environment;

determining, at the ego vehicle based on one or more measurements from the one or more sensors, the second value of the parameter of the environment; and determining, at the ego vehicle, a perception of the environment based on the first value of the parameter of the environment and the second value of the parameter of the environment, while giving more weight to the one of the first value of the parameter of the environment and the second value of the parameter of the environment that is more reliable.

14. The environment perception method of claim 11, further comprising:

receiving, at the ego vehicle, the first value of the parameter of the environment;

determining, at the ego vehicle based on one or more measurements from the one or more sensors, the second value of the parameter of the environment; and calibrating, at the ego vehicle, at least one of the one or more sensors using the first value of the parameter of the environment, based on the reliability indication indicating that the first value of the parameter of the environment is more reliable than the second value of the parameter of the environment.

15. The environment perception method of claim 14, wherein the calibrating the at least one of the one or more sensors is further based on the first value of the parameter of the environment differing by less than a threshold amount from the second value of the parameter of the environment.

16. The environment perception method of claim 11, further comprising:

receiving, at the ego vehicle, the first value of the parameter of the environment;

determining, at the ego vehicle based on one or more measurements from the one or more sensors, the second value of the parameter of the environment; and performing, at the ego vehicle, fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

17. The environment perception method of claim 16, wherein performing the fault mitigation comprises performing one of a hierarchy of fault mitigation operations based on availability of a driver or availability of one or more resources of the ego vehicle.

18. The environment perception method of claim 17, wherein a highest priority of the hierarchy of fault mitigation operations comprises providing driving control of the ego vehicle to the driver.

19. The environment perception method of claim 11, wherein:

receiving the one or more first reliability factors comprises receiving, for each of a plurality of devices external to the ego vehicle, one or more respective first reliability factors;

determining the first reliability comprises determining a plurality of first reliabilities each corresponding to a respective one of the plurality of devices and a respective first value of the parameter of the environment, and each based on the one or more respective first reliability factors; and providing the reliability indication comprises providing an indication of one or more most reliable values of the parameter of the environment corresponding to one or more highest reliabilities of the plurality of first reliabilities and the second reliability.

20. The environment perception method of claim 19, wherein providing the indication of the one or more most reliable values of the parameter of the environment comprises transmitting, from the ego vehicle, a list of most reliable values of the parameter of the environment with indications of relative reliabilities.

21. An environment perception system, of an ego vehicle, comprising:

means for receiving, from a device external to the ego vehicle, a plurality of first reliability factors associated with the device and with a first value of a parameter of an environment containing the ego vehicle;

means for determining, based on the plurality of first reliability factors, a first reliability trust score of the first value of the parameter;

means for determining, based on a plurality of second reliability factors associated with the ego vehicle and with a second value of the parameter of the environment provided by one or more sensors of the ego vehicle, a second reliability trust score of the second value of the parameter of the environment;

means for providing a reliability indication indicating which of the first value of the parameter of the environment and the second value of the parameter of the environment is more reliable based on which of the first reliability trust score and the second reliability trust score indicates a higher reliability; and means for performing, based on the reliability indication, at least one autonomous driving operation comprising:

at least one of calibrating at least a first one of the one or more sensors using the first value of the parameter of the environment based on the first trust score indicating higher reliability than the second trust score; and evaluating an environment near the ego vehicle using at least a second one of the one or more sensors without calibrating the second one of the one or more sensors based on the second trust score indicating higher reliability than the first trust score.

22. The environment perception system of claim 21, wherein the one or more first reliability factors indicate a type of the device, or a first sensor type, or an age of the device, or an age of a sensor corresponding to the first value of the parameter of the environment, or a distance between the ego vehicle and the device, or a security integrity level of the device, or a safety integrity level of the device, or a software version associated with a sensor of the device, or a mileage of the device, or a combination of any two or more thereof, and wherein the one or more second reliability factors indicate a type of the ego vehicle, or a second sensor type, or an age of the ego vehicle, or an age of a sensor corresponding to the second value of the parameter of the environment, or the distance between the ego vehicle and the device, or a security integrity level of the ego vehicle, or a safety integrity level of the ego vehicle, or a software version associated with one or more of the one or more sensors of the ego vehicle, or a mileage of the ego vehicle, or a combination of any two or more thereof.

23. The environment perception system of claim 21, further comprising:

means for receiving the first value of the parameter of the environment;

means for determining, based on one or more measurements from the one or more sensors, the second value of the parameter of the environment; and means for determining a perception of the environment based on the first value of the parameter of the environment and the second value of the parameter of the environment, while giving more weight to the one of the first value of the parameter of the environment and the second value of the parameter of the environment that is more reliable.

24. The environment perception system of claim 21, further comprising:

means for receiving the first value of the parameter of the environment;

means for determining, based on one or more measurements from the one or more sensors, the second value of the parameter of the environment; and means for calibrating at least one of the one or more sensors using the first value of the parameter of the environment, based on the reliability indication indicating that the first value of the parameter of the environment is more reliable than the second value of the parameter of the environment.

25. The environment perception system of claim 24, wherein the means for calibrating the at least one of the one or more sensors are for calibrating the at least one of the one or more sensors based further on the first value of the parameter of the environment differing by less than a threshold amount from the second value of the parameter of the environment.

26. The environment perception system of claim 21, further comprising:

means for receiving the first value of the parameter of the environment;

means for determining, based on one or more measurements from the one or more sensors, the second value of the parameter of the environment; and means for performing fault mitigation based on the reliability indication indicating that the first value of the parameter of the environment is more reliable than the second value of the parameter of the environment, and based on the first value of the parameter of the environment differing by more than a threshold amount from the second value of the parameter of the environment.

27. The environment perception system of claim 26, wherein the means for performing the fault mitigation comprise means for performing one of a hierarchy of fault mitigation operations based on availability of a driver or availability of one or more resources of the ego vehicle.

28. The environment perception system of claim 27, wherein a highest priority of the hierarchy of fault mitigation operations comprises providing driving control of the ego vehicle to the driver.

29. The environment perception system of claim 21, wherein:

the means for receiving the one or more first reliability factors comprise means for receiving, for each of a plurality of devices external to the ego vehicle, one or more respective first reliability factors;

the means for determining the first reliability comprise means for determining a plurality of first reliabilities each corresponding to a respective one of the plurality of devices and a respective first value of the parameter of the environment, and each based on the one or more respective first reliability factors; and the means for providing the reliability indication comprise means for providing an indication of one or more most reliable values of the parameter of the environment corresponding to one or more highest reliabilities of the plurality of first reliabilities and the second reliability.

30. A non-transitory, processor-readable storage medium comprising processor-readable instructions to cause one or more processors of an ego vehicle to:

receive, from a device external to the ego vehicle, a plurality of first reliability factors associated with the device and with a first value of a parameter of an environment containing the ego vehicle;

determine, based on the plurality of first reliability factors, a first reliability trust score of the first value of the parameter;

determine, based on a plurality of second reliability factors associated with the ego vehicle and with a second value of the parameter of the environment provided by one or more sensors of the ego vehicle, a second reliability trust score of the second value of the parameter of the environment;

provide a reliability indication indicating which of the first value of the parameter of the environment and the second value of the parameter of the environment is more reliable based on which of the first reliability trust score and the second reliability trust score indicates a higher reliability; and perform, based on the reliability indication, at least one autonomous driving operation comprising:

at least one of calibrating at least a first one of the one or more sensors using the first value of the parameter of the environment based on the first trust score indicating higher reliability than the second trust score; and evaluating an environment near the ego vehicle using at least a second one of the one or more sensors without calibrating the second one of the one or more sensors based on the second trust score indicating higher reliability than the first trust score.

* * * * *